United States Patent
Chi et al.

(10) Patent No.: US 9,094,246 B1
(45) Date of Patent: Jul. 28, 2015

(54) PURE DIFFERENTIAL SIGNAL BASED MIPI DSI/CSI-2 RECEIVER SYSTEMS

(71) Applicants: Xiaoming Chi, Beijing (CN); Bin Huo, Wayland, MA (US)

(72) Inventors: Xiaoming Chi, Beijing (CN); Bin Huo, Wayland, MA (US)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 14/252,411

(22) Filed: Apr. 14, 2014

(51) Int. Cl.
- H04B 3/00 (2006.01)
- H04L 25/00 (2006.01)
- H04L 25/02 (2006.01)

(52) U.S. Cl.
CPC ........ H04L 25/0292 (2013.01); H04L 25/0272 (2013.01)

(58) Field of Classification Search
USPC .......... 375/257, 258, 317, 377, 286; 327/108, 327/65; 326/82, 86; 341/143, 159
See application file for complete search history.

(56) References Cited

U.S. PATENT DOCUMENTS

| | | | | |
|---|---|---|---|---|
| 5,929,655 A * | 7/1999 | Roe et al. | ......... | 326/82 |
| 6,701,280 B2 * | 3/2004 | Horne et al. | ......... | 702/177 |
| 7,127,003 B2 * | 10/2006 | Rajan et al. | ......... | 375/286 |
| 7,953,162 B2 * | 5/2011 | Shetty | ......... | 375/257 |
| 8,135,029 B1 | 3/2012 | Vasudevan et al. | | |
| 8,223,796 B2 | 7/2012 | Pourbigharaz et al. | | |
| 8,711,877 B2 | 4/2014 | Suzuki | | |
| 2003/0201802 A1 * | 10/2003 | Young | ......... | 327/108 |
| 2004/0100309 A1 * | 5/2004 | Best et al. | ......... | 327/65 |
| 2009/0108872 A1 * | 4/2009 | Suenaga et al. | ......... | 326/82 |
| 2013/0329754 A1 | 12/2013 | Shin | | |
| 2014/0368667 A1 | 12/2014 | Peterson et al. | | |

FOREIGN PATENT DOCUMENTS

CN 103595862 A 2/2014

* cited by examiner

*Primary Examiner* — Phuong Phu
(74) *Attorney, Agent, or Firm* — Kenyon & Kenyon, LLP (57) ABSTRACT

A circuit may include a splitter, a controller, and a termination. The splitter may generate, based upon input signals, a plurality of output signals, wherein at least one of the input signals is in more than one different modes at different times and the output signals comprise a first set of the output signals generated based upon comparison of pairs of signals of the first set against each other and a second set of the output signals generated based upon comparison of each signal of the second set to a predetermined threshold voltage. The controller may determine, based upon the second set of the output signals, whether the input signals are in the one of the more than one different modes to generate one or more control signals. The termination may connect loads to each of the input lines, based upon the one or more control signals.

20 Claims, 6 Drawing Sheets

PURE DIFFERENTIAL SIGNAL BASED MIPI DSI/CSI-2 RECEIVER SYSTEMS

BACKGROUND

Some modern data interfaces may carry data signals in different modes at different times. For example, in digital camera interfaces, according to the Mobile Industry Processor Interface (MIPI) Display Interface (DSI)/Camera Serial Interface-2 (CSI-2) specification, Low Power (LP) mode single-ended signals and High Speed (HS) mode differential signals may be carried through the MIPI DSI/CSI-2 interface bus lines at different times. This may allow the interface to adjust trade off between power saving and high speed.

Normally to implement the protocol layer decoding, both LP mode signals and HS mode signals need to be converted from input lines to allow parallel and separate mode signal processing combined for use in protocol decoding, but the data interface carrying different mode signals at different times may require different bus line loading or termination. These requirements of loading and processing add complexity to the overall interface hardware.

Thus, there is a need for improved data interface compatible to standards like MIPI DSI/CSI-2 that can provide the correct bus line loading and signal processing while reducing overall hardware complexity.

DETAILED DESCRIPTION

According to the MIPI CSI-2 specification, two signaling modes are used: Low Power (LP) mode and High Speed (HS) mode.

Figure 5:
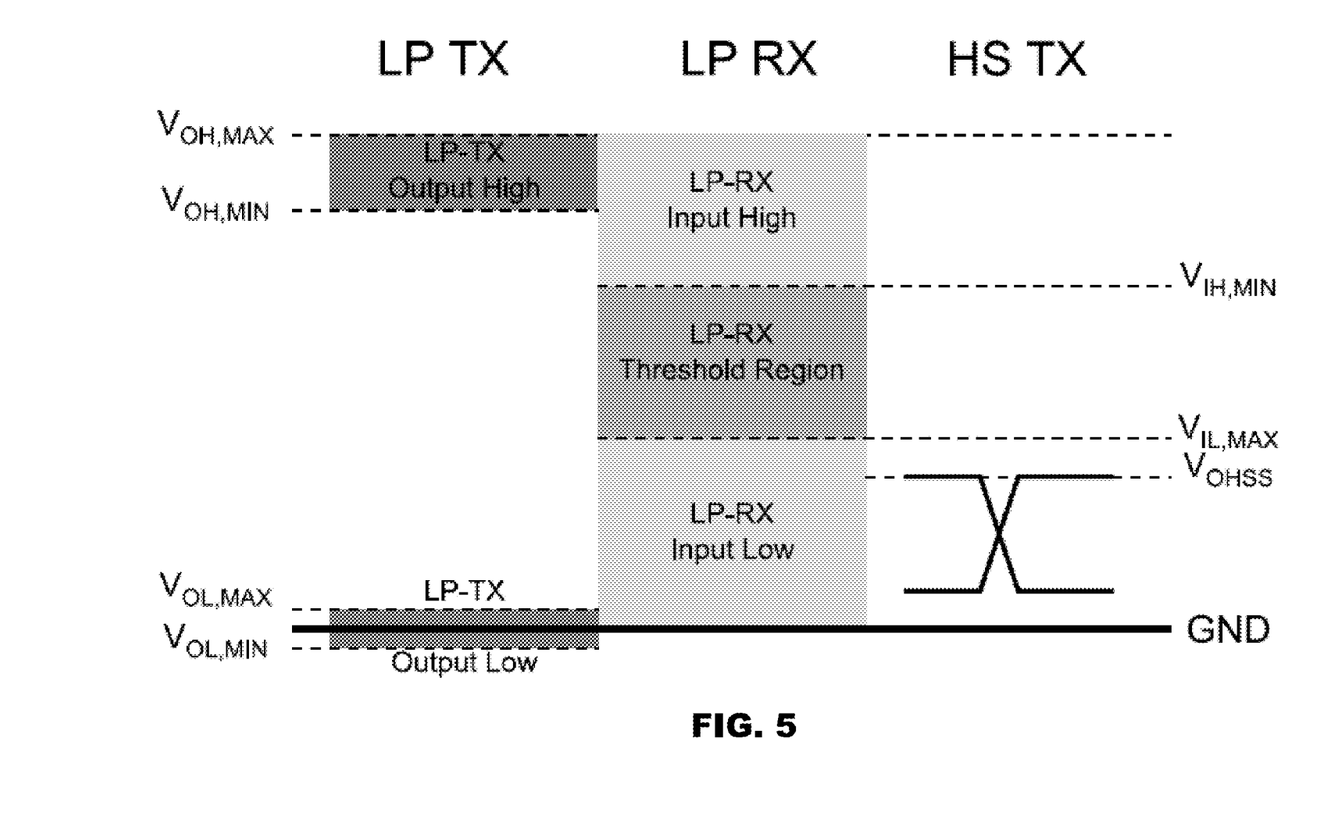
FIG. 5 illustrates a simplified timing diagram of MIPI DSI/CSI-2 interface signals used according to an embodiment of the present disclosure.

As illustrated in FIG. 5, LP mode is a single-ended push pull slew-rate limited CMOS interface, using a supply of 1.2 volt for example. LP mode has a self-clocked interface, with a maximum signal rate of 10 Mbps HS mode is a differential voltage mode, requiring split termination at the receiving side and back-terminated at transmission side. HS mode is a source-synchronous Double Data Rate (DDR) interface, with a maximum signal rate of 1Gbps.

LP mode signals have higher/wider voltage swings/range, 1.2 volt between minimum and maximum. LP mode signals may be used mainly for control, to tell the receiving side when to enable/disable the HS mode related circuits/logic, enable/disable Escape Low Power mode, etc.

The signals in LP mode are not always differential. For any lane (for example, RXCLK+ and RXCLK−), the LP mode signal may be 00/01/10/11.

HS mode signals have lower/narrower voltage swings/range, ~200 mV between minimum and maximum, and a Vcm (common mode voltage) of ~200 mV. HS mode signals may be used for high speed data transmission. The signals in HS mode are always differential, for example for RXCLK+ and RXCLK−, HS mode signal may ONLY be 01/10.

Figure 1:
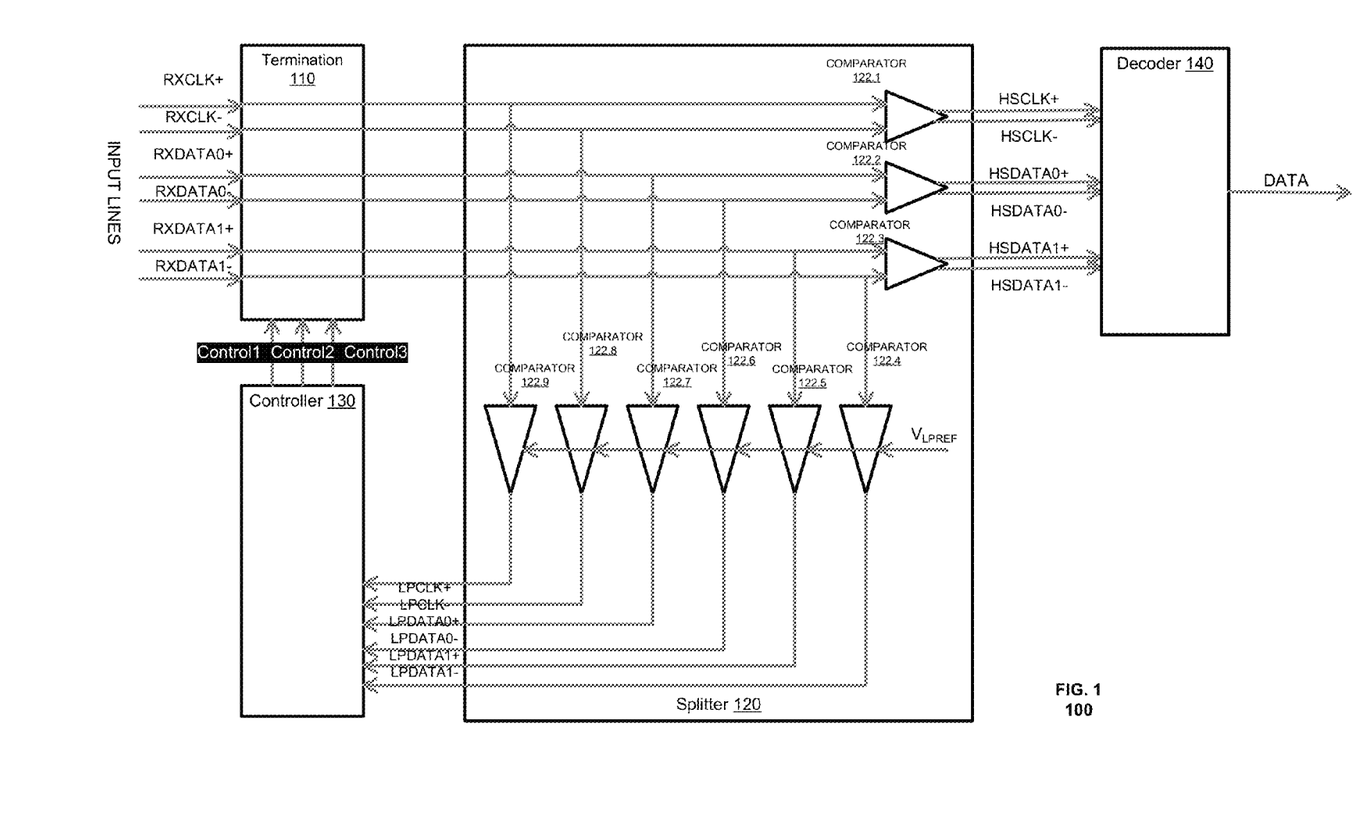
FIG. 1 illustrates a simplified block diagram of a circuit according to an embodiment of the present disclosure.

According to an embodiment in FIG. 1, a circuit 100 may include a splitter 120, a controller 130, and a termination 110. The splitter 120 may generate, based upon a plurality of input signals (RXCLK+, RXCLK−, RXDATA0+, RXDATA0−, RXDATA1+, RXDATA1−) received on a plurality of input lines, a plurality of output signals (HSCLK+, HSCLK−, HSDATA0+, HSDATA0−, HSDATA1+, HSDATA1−, LPCLK+, LPCLK−, LPDATA0+, LPDATA0−, LPDATA1+, LPDATA1−), wherein at least one of the input signals (RXCLK+, RXCLK−, RXDATA0+, RXDATA0−, RXDATA1+, RXDATA1−) is in more than one different modes at different times and the output signals may include a first set (HSCLK+, HSCLK−, HSDATA0+, HSDATA0−, HSDATA1+, HSDATA1−) of the output signals generated based upon comparison of pairs of signals of the input signals against each other and a second set (LPCLK+, LPCLK−, LPDATA0+, LPDATA0−, LPDATA1+, LPDATA1−) of the output signals generated based upon comparison of each signal of the input signals to a predetermined threshold voltage ($V_{LPREF}$). The controller 130 may determine, based upon the second set (LPCLK+, LPCLK−, LPDATA0+, LPDATA0−, LPDATA1+, LPDATA1−) of the output signals, whether the input signals (RXCLK+, RXCLK−, RXDATA0+, RXDATA0−, RXDATA1+, RXDATA1−) are in the one of the more than one different modes to generate one or more control signals (Control1, Control2, Control3, . . . ). The termination 110 may connect loads to each of the input lines, based upon the one or more control signals (Control1, Control2, Control3, . . . ).

The more than one different modes may include a high-speed differential signal mode for transmitting data and a low power single-ended signal mode, as specified in the MIPI DSI/CSI-2 specification. According to the embodiment above, the circuit 100 may automatically provide appropriate loads to the input lines during different modes of signals in the input lines, without significant circuit complexity.

In the illustrated embodiment, 3 pairs of input signal lines are used in the interface for signal processing, 2 clock lines (RXCLK+, RXCLK−), 4 data lines (RXDATA0+, RXDATA0−, RXDATA1+, RXDATA1−). However, additional input signal lines may be used as needed according to various interface protocols.

According to an embodiment, the circuit 100 may include a decoder 140, which may decode only the first set (HSCLK+, HSCLK−, HSDATA0+, HSDATA0−, HSDATA1+, HSDATA1−) of the output signals to determine start and end of a plurality of data segments in one of the more than one different modes in the plurality of input signals.

The one or more control signals (Control1, Control2, Control3, . . . ) may control the termination 110 to connect or disconnect the loads to each of the input lines, depending on which of the more than one different modes the input signals are in.

The one or more control signals (Control1, Control2, Control3, . . . ) may control the termination 110 to connect the loads to each of the input lines, when the input signals are in a differential signal mode. For example, connecting the load to the input lines when the input signals are in HS mode.

The one or more control signals (Control1, Control2, Control3, . . . ) may control the termination 110 to connect the loads to each of the input lines, when the input signals are not in a single-ended signal mode. For example, connecting the load to the input lines when the input signals are not in LP mode.

The one or more control signals (Control1, Control2, Control3, . . . ) may control the termination 110 to disconnect the loads to each of the input lines, when the input signals are in a single-ended signal mode. For example, disconnecting the load to the input lines when the input signals are in LP mode.

The splitter 120 may include a plurality of comparators (122.1-122.9). The splitter 120 may function to convert and split the input signals (RXCLK+, RXCLK−, RXDATA0+, RXDATA0−, RXDATA1+, RXDATA1−) into HS mode pure differential signals in a first set (HSCLK+, HSCLK−, HSDATA0+, HSDATA0−, HSDATA1+, HSDATA1−) and LP mode pure single-ended signals in a second set (LPCLK+, LPCLK−, LPDATA0+, LPDATA0−, LPDATA1+, LPDATA1−).

The comparators (122.1-122.9) may each include some predetermined hysteresis, to prevent the comparators (122.1-122.9) from switching states when input differentials are not sufficiently high. This may be particularly important to the comparators (122.1-122.3) for generating the first set (HSCLK+, HSCLK−, HSDATA0+, HSDATA0−, HSDATA1+, HSDATA1−), since these comparators (122.1-122.3) may be on all the time, and during LP mode, the input signals (RXCLK+, RXCLK−, RXDATA0+, RXDATA0−, RXDATA1+, RXDATA1−) may not be differential signal pairs. This may prevent the comparators (122.1-122.3) from generating random invalid data for the first set (HSCLK+, HSCLK−, HSDATA0+, HSDATA0−, HSDATA1+, HSDATA1−), thus stabilizing the first set (HSCLK+, HSCLK−, HSDATA0+, HSDATA0−, HSDATA1+, HSDATA1−) during the LP mode in the input signals (RXCLK+, RXCLK−, RXDATA0+, RXDATA0−, RXDATA1+, RXDATA1−).

Three of the comparators (122.1-122.3) may be used to differentially compare pairs of the input signals against each other (i.e. RXCLK+ against RXCLK−, RXDATA0+ against RXDATA0−, RXDATA1+ against RXDATA1−), to generate three pairs of differential signals (HSCLK+, HSCLK−, HSDATA0+, HSDATA0−, HSDATA1+, HSDATA1−). Three of the comparators (122.1-122.3) may also generate the three pairs of differential signals (HSCLK+, HSCLK−, HSDATA0+, HSDATA0−, HSDATA1+, HSDATA1−) at different common mode voltage than the input signals (RXCLK+, RXCLK−, RXDATA0+, RXDATA0−, RXDATA1+, RXDATA1−).

Six of the comparators (122.4-122.9) may be used to compare each of the input signals against a predetermined threshold voltage (i.e. RXCLK+, RXCLK−, RXDATA0+, RXDATA0−, RXDATA1+, RXDATA1−, each against predetermined threshold voltage $V_{LPREF}$), to generate six single-ended signals (LPCLK+, LPCLK−, LPDATA0+, LPDATA0−, LPDATA1+, LPDATA1−). The predetermined threshold voltage $V_{LPREF}$ may be fixed or adjustable (generated for example from a controllable DAC). Six of the comparators (122.4-122.9) may also generate the six single-ended signals (LPCLK+, LPCLK−, LPDATA0+, LPDATA0−, LPDATA1+, LPDATA1−) at different voltage threshold ranges than the input signals (RXCLK+, RXCLK−, RXDATA0+, RXDATA0−, RXDATA1+, RXDATA1−). The single-ended signals (LPCLK+, LPCLK−, LPDATA0+, LPDATA0−, LPDATA1+, LPDATA1−) may have independent polarities from each other. A high signal in any of the single-ended signals (LPCLK+, LPCLK−, LPDATA0+, LPDATA0−, LPDATA1+, LPDATA1−) may indicate that the input signals (RXCLK+, RXCLK−, RXDATA0+, RXDATA0−, RXDATA1+, RXDATA1−) are not exceeding the LP mode threshold voltage $V_{LPREF}$, thus indicating that the input signals (RXCLK+, RXCLK−, RXDATA0+, RXDATA0−, RXDATA1+, RXDATA1−) are in the HS mode.

The more than one different modes may include a high-speed differential signal mode for transmitting data and a low power single-ended signal mode, wherein the low power single-ended signal mode has wider signal voltage range than the high-speed differential signal mode.

The decoder 140 may include a state-machine (not shown) processing only the first set (HSCLK+, HSCLK−, HSDATA0+, HSDATA0−, HSDATA1+, HSDATA1−) of the output signals to determine a plurality of states of the data segments. That is, the input signals may contain useful data for reception and processing ONLY during some of the different modes, here for example, data is transmitted ONLY during the HS mode with differential signals. Thus, the decoder 140 may only need to process the data from the first set (HSCLK+, HSCLK−, HSDATA0+, HSDATA0−, HSDATA1+, HSDATA1−) of the output signals; the first set represents input signals filtered for the HS mode. In contrast, the input signals may contain no useful data when in the LP mode, thus the decoder 140 may ignore (not consider or disconnected from) the second set (LPCLK+, LPCLK−, LPDATA0+, LPDATA0−, LPDATA1+, LPDATA1−) of the output signals, the second set represents input signals filtered for the LP mode.

The decoder 140, for example, may detect the start and end of each HS mode signal sequence in the input signals (RXCLK+, RXCLK−, RXDATA0+, RXDATA0−, RXDATA1+, RXDATA1−), by for example detecting the start and end of the first set (HSCLK+, HSCLK−, HSDATA0+, HSDATA0−, HSDATA1+, HSDATA1−) of the output signals, and process the data segments between the start and end of each HS mode signal sequence to properly collate and sequence the data segments, and to generate the sequenced data as output from the decoder 140. The decoder 140 may include processors, memories, to perform other data or signal processing as needed according to various interface or communication standards. In this configuration, the circuit 100 may only need to process 1 set (or some but not all) of output signals to decode for the data, reducing the overall hardware complexity of the interface.

According to MIPI DSI/CSI-2 specification, normally to implement the protocol layer decoding, both LP mode single-ended signals and HS mode differential signals should be used for mode control state machine, but this invention shows it is possible to use only differential signals to accomplish mode control and protocol layer decoding.

Figure 2:
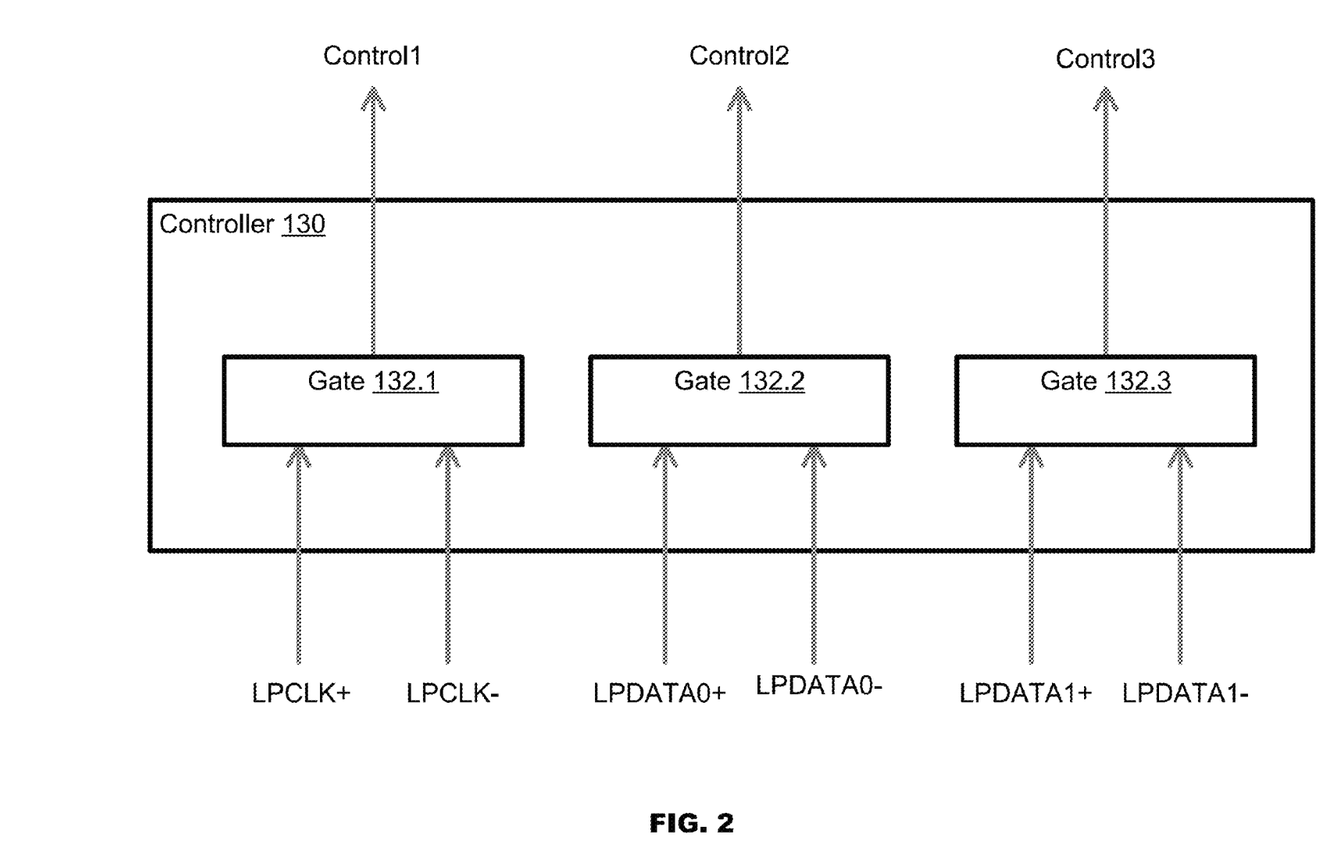
FIG. 2 illustrates a simplified block diagram of a circuit according to an embodiment of the present disclosure.

According to an embodiment in FIG. 2, a controller 130 may include a plurality of gates 132.1-132.3, to generate control signals Control1, Control2, and Control3 (and additional control signals ControlN, etc. not shown), based upon the second set (LPCLK+, LPCLK−, LPDATA0+, LPDATA0−, LPDATA1+, LPDATA1−) of the output signals from the splitter 120.

There may be one control signal for controlling conversion of each pair of output signals, or some output signals may individually controlled for conversion by a specific unique corresponding control signal.

According to an embodiment, the gates 132.1-132.3 may each include a connector (not shown), to connect 1 of each pair of signals in the second set (LPCLK+, LPCLK−, LPDATA0+, LPDATA0−, LPDATA1+, LPDATA1−) to one of the control signals Control1, Control2, and Control3. That is, gate 132.1 may connect 1 of (LPCLK+, LPCLK−) to Control1, gate 132.2 may connect 1 of (LPDATA0+, LPDATA0−) to Control2, gate 132.3 may connect 1 of (LPDATA1+, LPDATA1−) to Control3. In this configuration, a high signal at each of the control signals Control1, Control2, and Control3 may indicate that the input signals are in the HS mode.

According to an embodiment, the gates 132.1-132.3 may each include a switch (not shown), selectable to connect 1 of each pair of signals in the second set (LPCLK+, LPCLK−, LPDATA0+, LPDATA0−, LPDATA1+, LPDATA1−) to one of the control signals Control1, Control2, and Control3. That is, gate 132.1 may be selected to connect 1 of (LPCLK+, LPCLK−) to Control1, gate 132.2 may be selected to connect 1 of (LPDATA0+, LPDATA0−) to Control2, gate 132.3 may be selected to connect 1 of (LPDATA1+, LPDATA1−) to Control3. The gates 132.1-132.3 may be preset with specific connections, or may be altered during operation of circuit 100. In this configuration, a high signal at each of the control signals Control1, Control2, and Control3 may indicate that the input signals are in the HS mode.

Alternatively, according to an embodiment, the gates 132.1-132.3 may each include a logic gate (not shown, for example, a NOR, a NAND, etc.), to generate each one of the control signals Control1, Control2, and Control3, based upon each pair of signals in the second set (LPCLK+, LPCLK−, LPDATA0+, LPDATA0−, LPDATA1+, LPDATA1−). That is, gate 132.1 may generate Control1 as a logic function of (LPCLK+, LPCLK−), gate 132.2 generate Control2 as a logic function of (LPDATA0+, LPDATA0−), gate 132.3 may generate Control3 as a logic function of (LPDATA1+, LPDATA1−). The gates 132.1-132.3 may be preprogrammed with specific logic functions, or may have its logic functions altered during operation of circuit 100. In this configuration, a high signal at each of the control signals Control1, Control2, and Control3 may indicate that the input signals are NOT in the LP mode.

Figure 3:
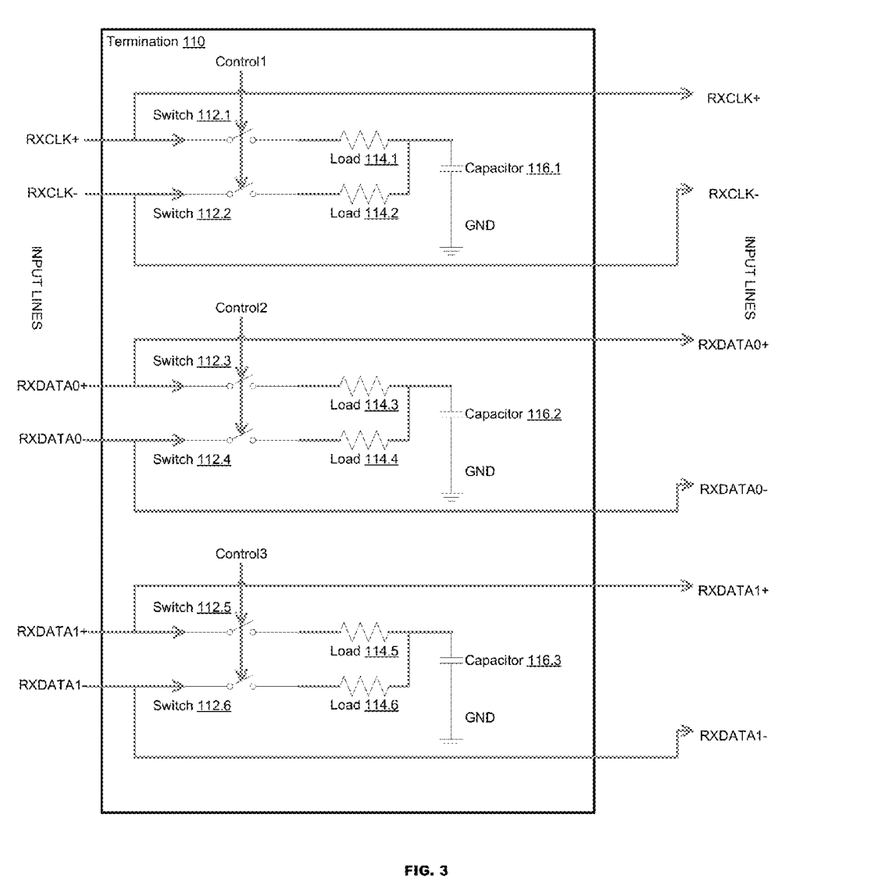
FIG. 3 illustrates a simplified block diagram of a circuit according to an embodiment of the present disclosure.

According to an embodiment in FIG. 3, a termination 110 may include switches 112.1-112.6, loads 114.1-114.6, and capacitors 116.1-116.3. This illustrates a termination 110 for 3 pairs of input lines, but additional switches, loads and capacitors may be used in similar configuration for additional input lines. Each of the input lines with the input signals (RXCLK+, RXCLK−, RXDATA0+, RXDATA0−, RXDATA1+, RXDATA1−) passes through the termination 110, and each of the input lines with the input signals (RXCLK+, RXCLK−, RXDATA0+, RXDATA0−, RXDATA1+, RXDATA1−) is tapped in the termination 110, and connected to a respective switch 112.1-112.6 and a respective load 114.1-114.6. Each pairs of loads 114.1-114.6 are commonly connected on one end to a capacitor 116.1-116.3. The node of the capacitor that is not connected to the loads 114.1-114.6, may be connected to ground GND. This configuration provides the needed loading for the input lines during some signal modes, for example, the HS mode. The switches 112.1-112.6 may be controlled by control signals Control1, Control2, Control3, . . . in respective pairs (or individually by corresponding control signals), and may each be a high speed switch configured to connect the loads 114.1-114.6 and/or the capacitor 116.1-116.3 to the input lines, in specific signal mode conditions in the input lines, for example, in one or more differential signal modes, only in the HS mode, when not in LP mode.

MIPI DSI/CSI-2 is a scalable lane-based interface, which supports 1/2/3/4 lane modes. 1 lane mode uses 1 pair of clock lines and 1 pair of data lines. 2 lane mode uses 1 pair of clock lines and 2 pairs of data lines. 4 lane mode uses 1 pair of clock lines and 4 pairs of data lines.

For protocol layer decoding, MIPI DSI/CSI-2 signals may be converted to separate signal-ended and differential signals in the PHY interface circuit. These signals may be used for protocol decoding. More lanes need more interconnections between physical layer (signal converter side) and protocol layer (decoder side). Take 4 lane mode for example, after phy-interface, MIPI signals may be converted to 5 pairs of differential signals and 10 single-ended signals, requiring 20 pins for connection, if all of the signals are used for decoding.

Because LP mode signals have wider voltage swing/range, to filter only valid LP mode signals for output as the second set (LPCLK+, LPCLK−, LPDATA0+, LPDATA0−, LPDATA1+, LPDATA1−), an appropriate predetermined threshold voltage $V_{LPREF}$ may be chosen from the LP-RX Threshold Region. By setting the predetermined threshold voltage $V_{LPREF}$/the outputs of the second set (LPCLK+, LPCLK−, LPDATA0+, LPDATA0−, LPDATA1+, LPDATA1−) will be '0' during non-LP modes in the input signals.

The MIPI HS interface is a source-synchronous DDR interface. The clock and data are sent together, and trace lengths are matched in order to maintain the timing relationship between them. Data is clocked into the receiver side on both the rising and falling edges of the clock. This means that for a given data rate, the clock frequency will be one half, e.g. if the data rate is 500 Mbps, the clock will have a frequency of 250 MHz. The timing relationship between the clock and data is a quadrature, or 90 degree relationship. That is, the clock edges are aligned with the center of the data eyes.

Figure 6:
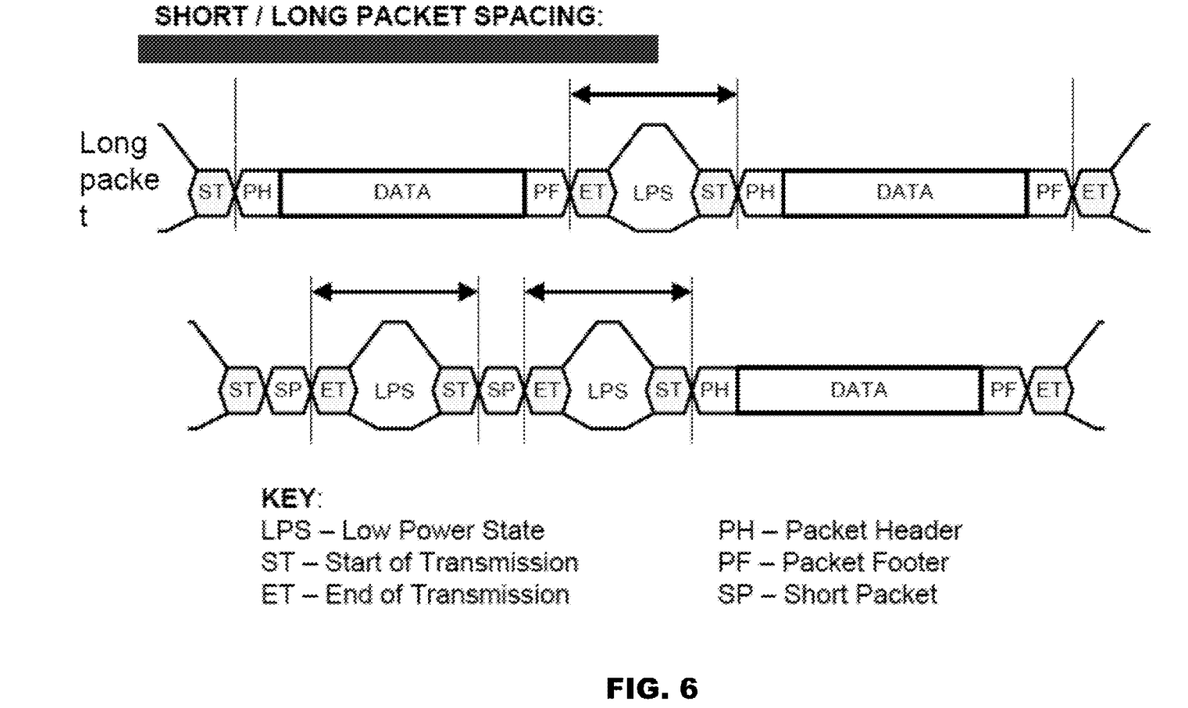
FIG. 6 illustrates a simplified timing diagram of MIPI DSI/CSI-2 interface signals used according to an embodiment of the present disclosure.

As illustrated in FIG. 6, to enter the HS mode, input signals in LP mode make the following transition: 11 to 01 to 00. This is followed by input signals in HS mode with data value of zero (01) in several continuous clock cycles, and then a Start of Transmission (SoT) sequence. Data in HS mode then follows.

To exit the HS mode, input signals in HS mode carry an End of Transmission (EoT) sequence following after the last valid HS mode data bit. Then input signals in LP mode make the following transition: 00 to 11.

SoT and EoT sequences may be defined in the MIPI DSI/CSI-2 D-PHY specification.

For example, SoT sequence may be a 8-bit data sequence '00011101'. HS mode zeros have to precede the SoT sequence for a period of time $T_{HS\text{-}ZERO}$ as may be specified according to various specifications.

Valid data sequences may follow after the last bit ('1') of the SoT sequence.

When seen in bit stream, SoT sequence may look like . . . 0000000011101 in binary.

EoT sequence may be more of a state than a sequence. The EoT state may need be maintained for a period of time $T_{HS\text{-}TRAIL}$ as may be specified according to various specifications, after the last valid HS mode data bit.

In the EoT state, the differential HS signals are inverted values of the last valid HS data. For example: if the last valid HS data bit was '0', the EoT sequence may be a continuous stream of '1's for a period of time $T_{HS\text{-}TRAIL}$.

Thus, the decoder 140 may be configured, for example, with a state machine (and other components), to detect only SoT and Packet Header sequences in the HS mode transmissions, by decoding ONLY the first set (HSCLK+, HSCLK−, HSDATA0+, HSDATA0−, HSDATA1+, HSDATA1−). The EoT state may be controlled by a FSM (Finite State Machine) with information from the packet header (Data ID and Word Count). This would be sufficient for the decoder 140 to then decode (and process) the data sequences in between the LP mode and HS mode, without the need to connect the decoder 140 to the other set (the second set (LPCLK+, LPCLK−, LPDATA0+, LPDATA0−, LPDATA1+, LPDATA1−)). This would dramatically decrease on the number of signal lines needed between the splitter/converter side to the decoder 140.

MIPI CSI-2 may have 2 types of data packet formats transmitted in the HS mode: Short Packets and Long Packets. Short packets are always 4 bytes in length. Short packets may be used for frame/line synchronization and as generic packets to send up to 16 bits of Short Packet Data Field per packet to the receiving side. Long packets consist of a 4-byte header, up to $2^16=65536$ bytes in payload and 2-byte checksum. Long packets may be used to transmit video content and embedded image data, i.e. useful or relevant data of interest. Once the receiver has read the Data Payload it reads the checksum in the Packet Footer.

Decoders may need to interleave data from multiple data lanes into 1 data lane format, which may require removing the gap for invalid data, collating, sequencing the data in the correct order, etc.

Split termination on the receiver side for HS mode only may involve loading connected to a centre tap to ground via a capacitor. This is to provide good termination for common mode signals on the MIPI lines during the HS mode.

However, this termination may need to be switchable, depending on what mode the transmitter is operating in, for LP mode, the termination should be off (or open), as it is not needed.

Suitable comparators (such as ADCMP604_605) may be used to accomplish MIPI signals to LVDS signals conversion (for the first set HS mode signals), and suitable comparators (such as ADCMP600_601_602) to accomplish MIPI signals to TTL/CMOS signals conversion (for the second set LP mode signals), which then may be used to automatically control high-speed switches (such as ADG901_902) so as to control the termination.

Then, the first set HS mode output signals may be used for MIPI DSI/CSI-2 protocol data decoding. The decoder 140 may include additional processing such as Hamming-modified Code for ECC (Error Correction Code) check, packet based protocol decoding, etc.

Figure 4:
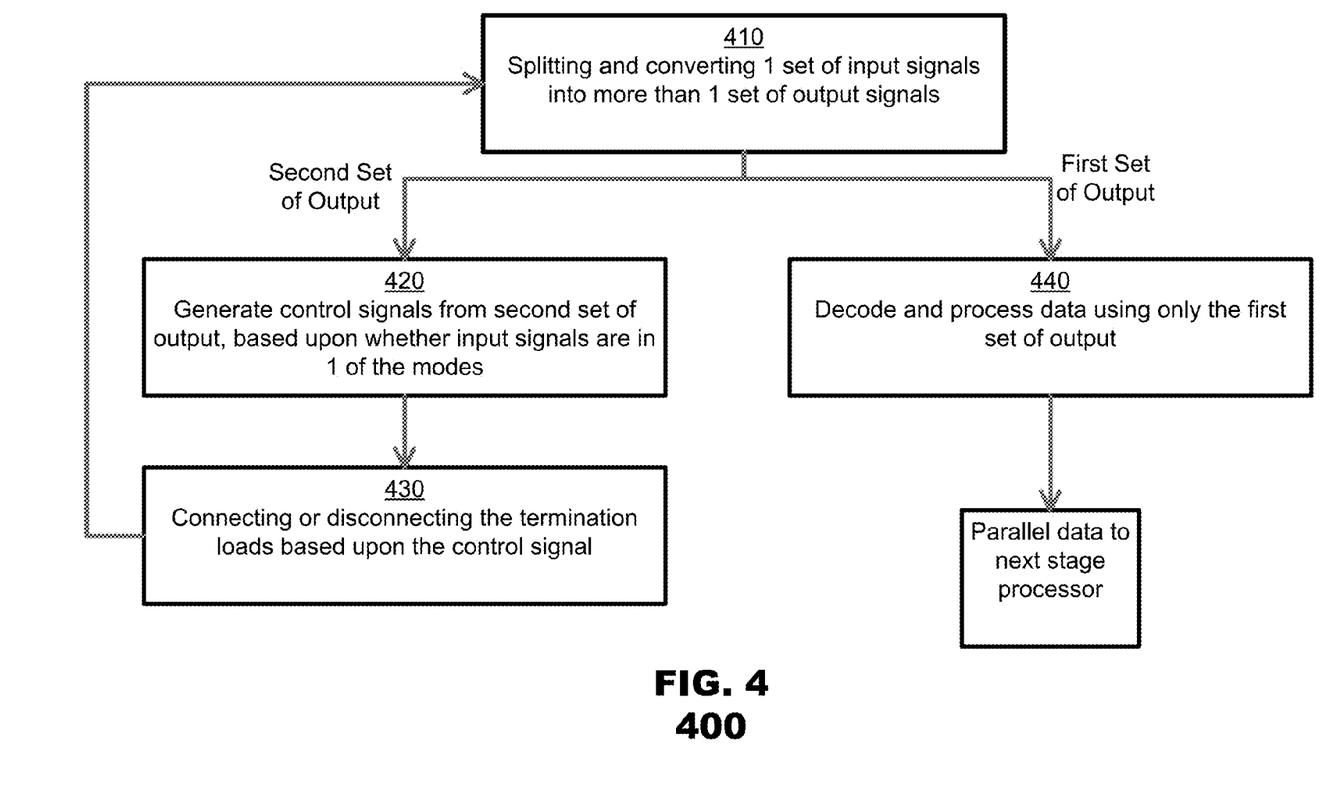
FIG. 4 illustrates a method according to an embodiment of the present disclosure.

According to an embodiment in FIG. 4, a method 400 may begin at block 410, generating, by a splitter 120, based upon a plurality of input signals received on a plurality of input lines, a plurality of output signals. The at least one of the input signals is in more than one different modes at different times and the output signals comprise a first set of the output signals generated based upon comparison of pairs of signals of the input signals against each other and a second set of the output signals generated based upon comparison of each signal of the input signals to a predetermined threshold voltage.

At block 420, determining, by a controller 130, based upon the second set of the output signals, whether the input signals are in the one of the more than one different modes to generate one or more control signals.

At block 430, connecting, by a termination 110, loads to each of the input lines, based upon the one or more control signals.

At block 440, concurrently to block 420 and block 430, decoding, by a decoder 140, only the first set of the output signals to determine start and end of a plurality of data segments in one of the more than one different modes in the plurality of input signals. Thereafter, the parallel data may be sent to a next-stage processor for additional data processing.

The circuit 100 may perform the method 400, using various additional components such as processors (not shown) along with non-transitory computer readable storage medium storing instructions for performing the method 400.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A circuit, comprising:
   a splitter generating, based upon a plurality of input signals received on a plurality of input lines, a plurality of output signals, wherein at least one of the input signals is in more than one different modes at different times and the output signals comprise a first set of the output signals generated based upon comparison of pairs of signals of the input signals against each other and a second set of the output signals generated based upon comparison of each signal of the input signals to a predetermined threshold voltage;
   a controller determining, based upon the second set of the output signals, whether the input signals are in the one of the more than one different modes to generate one or more control signals; and
   a termination connecting loads to each of the input lines, based upon the one or more control signals.

2. The circuit according to claim 1, wherein the one or more control signals control the termination to connect or disconnect the loads to each of the input lines, depending on which of the more than one different modes the input signals are in.

3. The circuit according to claim 1, wherein the one or more control signals control the termination to connect the loads to each of the input lines, when the input signals are in a differential signal mode.

4. The circuit according to claim 1, wherein the one or more control signals control the termination to connect the loads to each of the input lines, when the input signals are not in a single-ended signal mode.

5. The circuit according to claim 1, wherein the one or more control signals control the termination to disconnect the loads to each of the input lines, when the input signals are in a single-ended signal mode.

6. The circuit according to claim 1, wherein the splitter comprises a plurality of comparators.

7. The circuit according to claim 1, wherein the more than one different modes comprises a high-speed differential signal mode for transmitting data and a low power single-ended signal mode, wherein the low power single-ended signal mode has wider signal voltage range than the high-speed differential signal mode.

8. A circuit, comprising:
   a splitter generating, based upon a plurality of input signals received on a plurality of input lines, a plurality of output signals, wherein at least one of the input signals is in more than one different modes at different times and the output signals comprise a first set of the output signals generated based upon comparison of pairs of signals of the input signals against each other and a second set of the output signals generated based upon comparison of each signal of the input signals to a predetermined threshold voltage;
   a controller determining, based upon the second set of the output signals, whether the input signals are in the one of the more than one different modes to generate one or more control signals;
   a termination connecting loads to each of the input lines, based upon the one or more control signals; and
   a decoder decoding only the first set of the output signals to determine start and end of a plurality of data segments in one of the more than one different modes in the plurality of input signals.

9. The circuit according to claim 8, wherein the one or more control signals control the termination to connect or disconnect the loads to each of the input lines, depending on which of the more than one different modes the input signals are in.

10. The circuit according to claim 8, wherein the one or more control signals control the termination to connect the loads to each of the input lines, when the input signals are in a differential signal mode.

11. The circuit according to claim 8, wherein the one or more control signals control the termination to connect the loads to each of the input lines, when the input signals are not in a single-ended signal mode.

12. The circuit according to claim 8, wherein the one or more control signals control the termination to disconnect the loads to each of the input lines, when the input signals are in a single-ended signal mode.

13. The circuit according to claim 8, wherein the decoder comprises a state-machine processing only the first set of the output signals to determine a plurality of states of the data segments.

14. The circuit according to claim 8, wherein the more than one different modes comprises a high-speed differential signal mode for transmitting data and a low power single-ended signal mode, wherein the low power single-ended signal mode has wider signal voltage range than the high-speed differential signal mode.

15. A method, comprising:
generating, by a splitter, based upon a plurality of input signals received on a plurality of input lines, a plurality of output signals, wherein at least one of the input signals is in more than one different modes at different times and the output signals comprise a first set of the output signals generated based upon comparison of pairs of signals of the input signals against each other and a second set of the output signals generated based upon comparison of each signal of the input signals to a predetermined threshold voltage;
determining, by a controller, based upon the second set of the output signals, whether the input signals are in the one of the more than one different modes to generate one or more control signals; and
connecting, by a termination, loads to each of the input lines, based upon the one or more control signals.

16. The method according to claim 15, wherein the one or more control signals control the termination to connect or disconnect the loads to each of the input lines, depending on which of the more than one different modes the input signals are in.

17. The method according to claim 15, wherein the one or more control signals control the termination to connect the loads to each of the input lines, when the input signals are in a differential signal mode.

18. The method according to claim 15, wherein the one or more control signals control the termination to connect the loads to each of the input lines, when the input signals are not in a single-ended signal mode.

19. The method according to claim 15, wherein the one or more control signals control the termination to disconnect the loads to each of the input lines, when the input signals are in a single-ended signal mode.

20. The method according to claim 15, wherein the more than one different modes comprises a high-speed differential signal mode for transmitting data and a low power single-ended signal mode, wherein the low power single-ended signal mode has wider signal voltage range than the high-speed differential signal mode.

* * * * *